Figure 1:
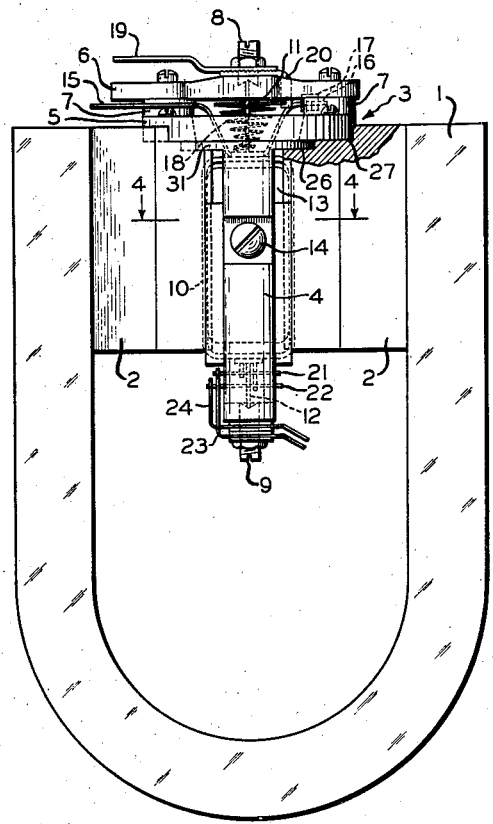

July 31, 1945.  W. H. PEARCE  2,380,609
GALVANOMETER
Filed Jan. 14, 1943  2 Sheets-Sheet 1

INVENTOR.
WALTER H. PEARCE.
BY
*C B Spangenberg*
ATTORNEY.

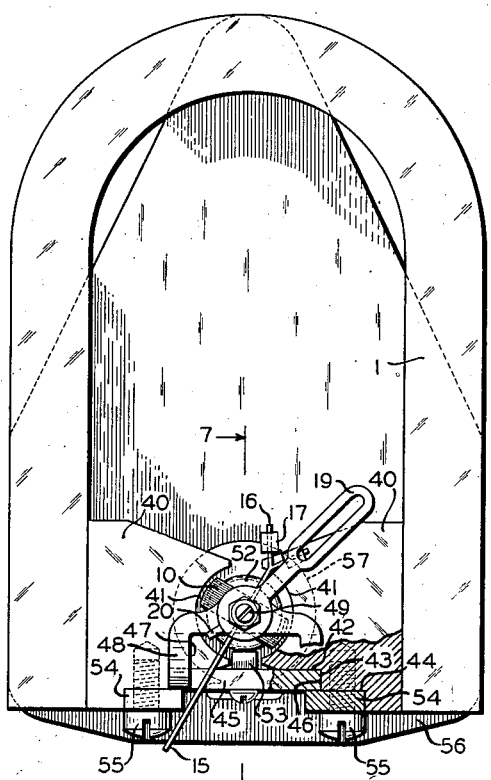
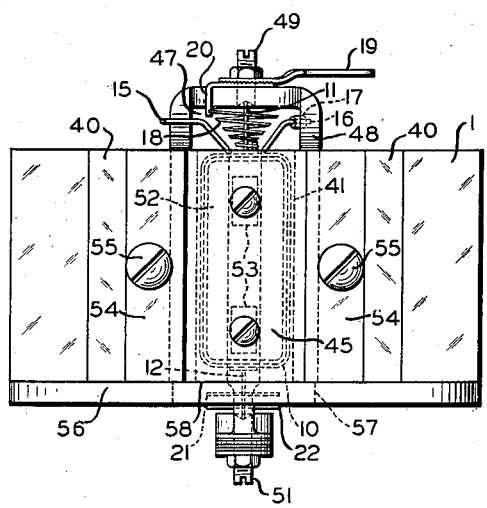
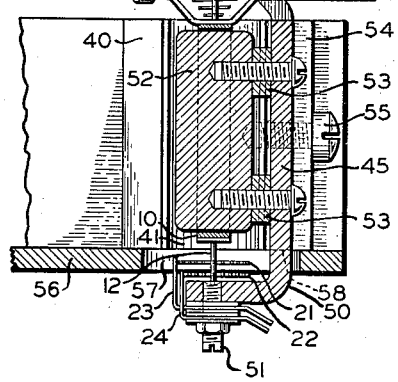

Patented July 31, 1945

2,380,609

UNITED STATES PATENT OFFICE 2,380,609

GALVANOMETER

Walter H. Pearce, North Hills, Pa., assignor to The Brown Instrument Company, Philadelphia, Pa., a corporation of Pennsylvania Application January 14, 1943, Serial No. 472,392

2 Claims. (Cl. 171—95)

The present invention relates to electrical measuring instruments, and more particularly to a deflecting galvanometer and a method of making the same.

It is a general object of the present invention to provide improvements in galvanometer construction which will both simplify its construction and reduce the cost of manufacture, and of providing a simple and effective galvanometer assembly.

The conventional galvanometer comprises a permanent magnet and pole piece assembly for establishing an intense magnetic field in an annular or cylindrical gap. A coil is suspended in some fashion to move through this gap in accordance with an electric current passing through the coil. Because of the intensity of the magnetic field and the small electrical currents measured the instrument is extremely sensitive to the alignment of the various parts of which it is composed. Also in the conventional galvanometer, each of the parts of which it is formed is individually assembled and adjusted as the galvanometer is put together. Because of this method of construction the parts are often not as accurately positioned as they should be and an unduly long time is required to adjust the parts relative to each other.

It is, accordingly, an object of the present invention to provide means to assemble the component parts of a galvanometer in such a fashion that they will be perfectly aligned with each other with a minimum of adjustment. It is a further object of the invention to make a galvanometer in which the coil assembly may be mounted upon an accurately formed support and placed, as a whole, in position in the magnet assembly. Such a construction permits the parts to be accurately machined prior to the time that the assemblies are put together so that they will exactly fit.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Figure 2:
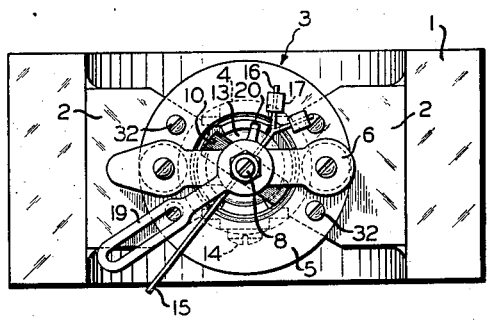
Figure 3:
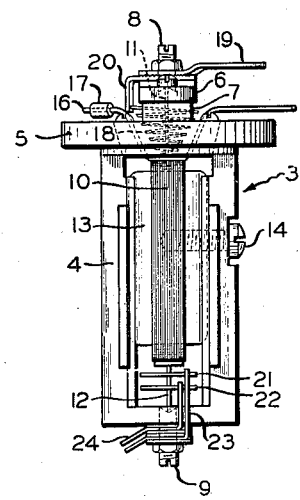
Figure 4:
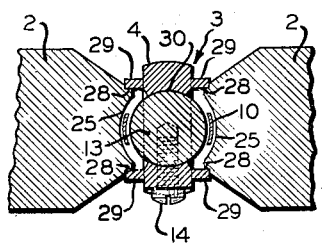

In the drawings:

Fig. 1 is a front view of a galvanometer,
Fig. 2 is a plan view of Figure 1,
Fig. 3 is a view of the coil assembly alone looking from the left in Figure 1,
Fig. 4 is a view on line 4—4 of Figure 1,
Fig. 5 is a plan view of a modified form of galvanometer,
Fig. 6 is a front view of the galvanometer of Figure 5, and
Fig. 7 is a view on line 7—7 of Figure 5.

Referring first to Figures 1 and 2, there is shown a galvanometer having a permanent magnet 1 to which are attached the usual pole pieces 2. Mounted between the pole pieces is a moving coil assembly which is supported upon a casting 3. The casting is made of some non-magnetic material such as aluminum and is formed as a generally U-shaped member 4 to the end of the legs of which is attached an annular disc 5. The moving coil of the galvanometer is shown at 10 and is supported for rotative movement on pivot shafts 11 and 12. The shaft 11 is received in the cup-shaped end of a bearing screw 8 that is in turn threaded into an opening in a cross-piece 6. This cross-piece is attached to the upper surface of the disc 5 and is spaced a suitable distance from the disc by washers 7. Pivot shaft 12 is received in the cup-shaped end of a bearing screw 9 that is threaded into the cross-piece of the U-shaped portion 4 of the casting. The bearing screws 8 and 9 are coaxial and may be adjusted in their respective cross-pieces to properly position the coil axially and to take-up play in the pivots.

The galvanometer coil 10 surrounds a cylindrical core 13 of magnetic material. Core 13 is located between the legs of the U-shaped portion 4, as best shown in Figure 4, and is fastened in position by means of a screw 14 that passes through one of the legs of the U and into the core.

A pointer 15 is attached to the upper end of the coil 10 to move with the coil as it is deflected. This pointer surrounds the pivot shaft 11 and is provided with rearwardly projecting extensions 16 each of which receives a balancing weight 17. By shifting the weight on the extensions the pointer and coil can be properly balanced.

Attached at one end to the shaft 11 is the usual flexible balancing spring 18 that serves to adjust the zero point of the pointer 15. The outer end of the spring 18 is connected to a rotatable adjusting arm 19 by means of a connecting piece 20. Said arm surrounds the bearing screw 8 and is frictionally held in engagement with the upper surface of cross-piece 6 by a nut on the bearing screw.

The lower pivot shaft 12 has on it two flexible conductors 21 and 22. Conductor 21 is connected to one end of the wire forming the coil 10 and to a terminal member 23 which surrounds the bearing screw 9 and is insulated from the same. In a like manner conductor 22 is connected to the other end of the wire forming coil 10 and to a terminal member 24 that also surrounds and is insulated from the screw 9. Both of the terminals are held in place on the screw 9 by a nut threaded over the end of the same.

As has been stated above, in assembling the galvanometer it is of the utmost importance to locate the various parts correctly with respect to each other. This is necessary in order to make the air gap between the pole pieces 2 and the core 13 uniform in size. To this end the casting 3 is accurately machined to size before the core 13 and coil 10 are assembled in it.

In order to properly locate the pole pieces in the magnet and the casting between the pole pieces, these parts are prepared in the following manner. The pole pieces 2 are first properly located relative to the magnet 1 and are then welded in place so that the pole pieces and magnet form an integral piece. This piece is then placed in a suitable fixture and subjected to a drilling operation so that the faces 25 of the pole pieces will be truly cylindrical. Thereafter other drilling operations are performed while the piece is still in its fixture to form faces 26 and 27 that are perpendicular to and coaxial with the surfaces 25. The piece and its fixture, or another suitable fixture are then placed in a machine such as a milling machine that can accurately form the four faces 28 that are parallel to the axis of the cylindrical air gap and perpendicular to faces 26 and 27.

Before the casting 3 has the various parts assembled in it, it is placed in a fixture and subjected to a suitable operation such as milling to form four tongues 29 on it and to form cylindrical surfaces 30 that extend parallel to these tongues and which serve to locate the core 13. The casting is then subjected to operations which will form a shoulder 31 and accurately machine the disc portion 5 both as to size and thickness. The shoulder 31 and disc 5 are both made concentric with the surfaces 30 and perpendicular to the same. The crosspiece of the U is then drilled to receive the bearing screw 9, with this opening concentric with the disc 5.

When the above described machining operations have been performed on the various parts the coil assembly is mounted in the casting 3. Because of the manner in which the parts have been operated upon the coil 10 and core 13 will be accurately located between the legs 4 and will be perpendicular to shoulder 31. The casting 3 is then moved down between the pole pieces with the tongues 29 engaging surfaces 28 until the lower surface of disc 5 and an extension thereof engage faces 27 and 26, respectively, of the pole pieces as shown in Figure 1. The parts are then properly located with respect to each other as best shown in Figures 1 and 4 with coil 10 and core 13 concentric with surfaces 25. The parts are held in this position by screws 32 which extend through the disc 5 into the upper part of the pole pieces.

The above described operations produce an accurate and sensitive galvanometer since the coil will move through an air space in which the magnetic flux is evenly distributed. The galvanometer, also, is inexpensive to make since the assembly time is greatly reduced due to the machining of the parts as described prior to their assembly. It is noted that each of the machining operations may be quickly performed on a standard machine tool.

Another embodiment of the invention is shown in Figures 5 to 7. In this embodiment the various parts are assembled in the same manner that they were assembled in the above described embodiment, the difference being in the manner in which the parts are machined and the support for the coil assembly.

As shown in Figure 5, the magnet 1 has pole pieces 40 welded to it, but in this case they are displaced 90° from the position they assumed in Figure 1. The unit consisting of the magnet and pole pieces is placed in a suitable fixture and subjected to a drilling operation in which the concentric surfaces 41 are formed. Thereafter the unit is placed in a machine such as a milling machine to have faces 42, 43 and 44 accurately formed on each pole piece, with these faces parallel to the surfaces 41. It will be noted that, in this embodiment, faces are formed on only one side of the pole pieces, whereas in the embodiment previously described faces were formed on both sides of each pole piece.

The coil assembly is mounted on a supporting member 45 that is made of non-magnetic material and which has its edges 46 and inner face machined to fit against faces 43 and 42, respectively, of the pole pieces. The upper end of the plate is bent as shown in Figure 7 and is formed with a large opening 47 which in effect makes a yoke member 48 that is used to support the upper coil bearing 49. The lower end of member 45 has a downwardly and rearwardly projecting arm 50 that is used to support the lower coil bearing 51. A core is attached to the rear face of member 45 by means of screws or rivets and is spaced from that face an amount so that it will be concentric with surfaces 41 on the pole pieces and coaxial with the bearing screws by spacer pieces 53. The member 45, core 52 and spacers 53 are in effect a single rigid unit that may have very accurate dimensions and upon which the moving coil is mounted. The coil 10 is mounted between bearing screws 49 and 51 in exactly the same manner that it was mounted between the bearing screws 8 and 9 in the previously described unit and the pointer 15 will extend through the opening 47.

In assembling the galvanometer, the coil is first properly mounted on the member 45 and this assembly is held above the magnet unit. The assembly is then moved downwardly, with the coil and core passing between the surfaces 41. A pair of guideways to help locate the member 45 and means to hold it in position are formed by members 54 that are adapted to lie against the faces 44 and to project beyond the faces 43. These members are held in place by screws 55.

In order to limit the amount that the member 45 can be moved downwardly to properly position the coil between the pole pieces a non-magnetic plate 56 is bolted or otherwise suitably fastened to the bottom of the magnet. This plate is provided with an opening 57 through which the extension 50 and the parts attached to it may project. The member 45 is limited in its downward movement by engagement between surfaces 58 formed on its lower edge and the upper surface of plate 56. Thus the parts are so located that the coil 10 may deflect in truly a cylindrical air space in which the magnetic flux is evenly distributed.

From the above description it will be seen that I have invented a method of preparing the parts for and assembling them into a galvanometer. In using the construction described by me an accurate and sensitive galvanometer may be made. Furthermore by means of this construction the assembly time for making a galvanometer will be appreciably reduced since the parts may very readily be located in their proper relative positions. It will also be seen that galvanometer is a superior one because of the accuracy with which the various parts are located with respect to each other.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. An electrical measuring instrument of the galvanometer type comprising a permanent magnet, a pair of pole pieces permanently attached to said magnet, said pole pieces being so formed that a cylindrical air gap is between them, each pole piece also having formed on a side thereof locating surfaces extending parallel to the cylindrical air gap and other locating surfaces extending perpendicular thereto, a coil supporting member fastened to said pole pieces and having locating surfaces formed thereon which engage the locating surfaces on the pole pieces to thereby accurately position the coil supporting member and pole pieces relative to each other, a cylindrical core attached to said coil support and located thereon in such a manner that it is concentric with the air gap, a coil pivotally mounted on said coil supporting member to deflect in said air gap in the space between said pole pieces and said core, and means to fasten said coil supporting member in position on said pole pieces.

2. A deflecting type electrical measuring instrument comprising a permanent magnet, pole pieces welded to the poles thereof, said pole pieces being spaced apart and machined to form an accurately dimensioned cylindrical air gap, locating surfaces formed on said pole pieces perpendicular to said air gap, other locating surfaces formed on said pole pieces perpendicular to said first locating surfaces, an assembly comprising a coil support having accurately formed locating surfaces formed on it which surfaces are adapted to cooperate with the surfaces formed on said pole pieces, a coil pivoted to said coil support and a core fastened to said coil support in a position to be received by said coil, and means to rigidly fasten said coil support to said pole pieces with the locating surfaces on the pole pieces in engagement with corresponding surfaces on said coil support.

WALTER H. PEARCE.